(12) United States Patent
Barr

(10) Patent No.: US 8,844,440 B1
(45) Date of Patent: Sep. 30, 2014

(54) APERTURE MARKING SYSTEM AND METHOD OF MARKING SURFACE

(71) Applicant: David E. Barr, Fredericksburg, VA (US)

(72) Inventor: David E. Barr, Fredericksburg, VA (US)

(*) Notice: Subject to any disclaimer, the term of this patent is extended or adjusted under 35 U.S.C. 154(b) by 0 days.

(21) Appl. No.: 13/719,977

(22) Filed: Dec. 19, 2012

(51) Int. Cl.
| | |
|---|---|
| *B41K 1/02* | (2006.01) |
| *B41K 1/56* | (2006.01) |
| *B25H 7/04* | (2006.01) |
| *B41K 3/56* | (2006.01) |

(52) U.S. Cl.
CPC ............................. *B41K 3/56* (2013.01)
USPC ............. 101/333; 101/405; 101/368; 33/671; 33/528

(58) Field of Classification Search
CPC ............. B41K 1/02; B41K 1/003; B25H 7/04
USPC ......... 101/327, 333, 103, 109, 405, 406, 368; 33/528, 529, 671
See application file for complete search history.

(56) References Cited

U.S. PATENT DOCUMENTS

| | | | | |
|---|---|---|---|---|
| 667,482 | A | * | 2/1901 | Worthington ............. 114/145 R |
| 3,597,099 | A | * | 8/1971 | Tollin et al. ........................ 401/7 |
| 3,745,664 | A | | 7/1973 | Altseimer |
| 3,913,235 | A | | 10/1975 | Tenneson et al. |
| D319,794 | S | | 9/1991 | Elkins |
| 6,470,585 | B2 | | 10/2002 | Barr |
| 2001/0027612 | A1 | * | 10/2001 | Barr ................................ 33/528 |
| 2002/0121205 | A1 | * | 9/2002 | Peterson ....................... 101/405 |
| 2003/0126756 | A1 | | 7/2003 | Ackerman |
| 2006/0010704 | A1 | * | 1/2006 | Galbreth ......................... 33/670 |
| 2008/0092401 | A1 | | 4/2008 | Holcombe |
| 2008/0250663 | A1 | * | 10/2008 | Galbreth ......................... 33/671 |

* cited by examiner

*Primary Examiner* — Leslie J Evanisko

(57) ABSTRACT

A marking system for cutting an aperture for pipe clearance has a pipe and a pipe stamp. A stamp posterior side has a posterior aperture fluidly connected to an interior cavity. A first rubber stamp projection has an annulus that projects out and away from the stamp anterior surface. A second rubber stamp projection is centrally located on the stamp anterior surface having a general shape of an "X". The pipe stamp slides over an end of the pipe via the posterior aperture. The first rubber stamp projection and the second rubber stamp projection are placed against a surface for applying a mark for cutting an aperture for pipe clearance.

11 Claims, 3 Drawing Sheets

APERTURE MARKING SYSTEM AND METHOD OF MARKING SURFACE

BACKGROUND OF THE INVENTION

Often when installing piping or installing structures around piping, a hole must be cut for the piping to pass through. This process can be tedious at best and inaccurate at worst leaving behind the scars of trial and error in the worst possible places. The present invention features a marking system for cutting an aperture for pipe clearance.

SUMMARY

The present invention features a marking system for cutting an aperture for projection clearance. In some embodiments, the system comprises a cylindrical projection. In some embodiments, the system comprises a generally cylindrical stamp having a stamp anterior side, a stamp posterior side, and a stamp side wall. In some embodiments, the stamp posterior side comprises a posterior aperture located thereon fluidly connected to an inner cavity. In some embodiments, the stamp anterior side comprises a generally planar stamp anterior surface. In some embodiments, the side wall inner diameter is about equal to the projection outer diameter. In some embodiments, the side wall inner diameter is adapted to be slidably inserted over the projection outer diameter.

In some embodiments, the system comprises a first rubber stamp projection located on the stamp anterior surface having an annulus that projects out and away from the stamp anterior surface. In some embodiments, the first rubber stamp projection comprises an inner diameter about equal to a projection outer diameter. In some embodiments, the system comprises a second rubber stamp projection centrally located on the stamp anterior surface having a first line and a second line comprising a general shape of an "X".

In some embodiments, the cylindrical stamp is adapted to be inserted onto an end of the projection via the posterior aperture. In some embodiments, the first rubber stamp projection and the second rubber stamp projection are adapted to be placed against a surface for applying a mark for cutting an aperture for projection clearance.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
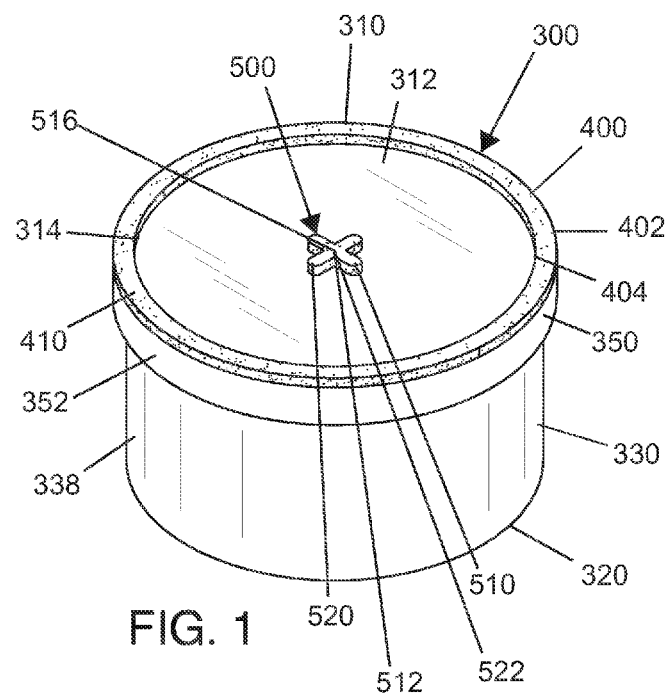
FIG. 1 is a perspective view of the cylindrical stamp of the present invention.
Figure 2:
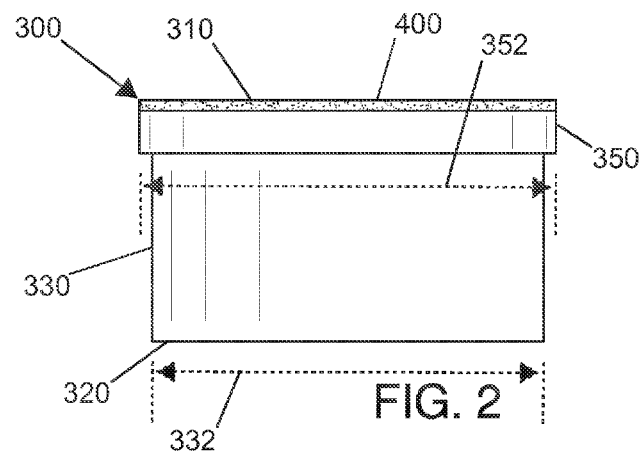
FIG. 2 is a side view of the cylindrical stamp of the present invention.
Figure 3:
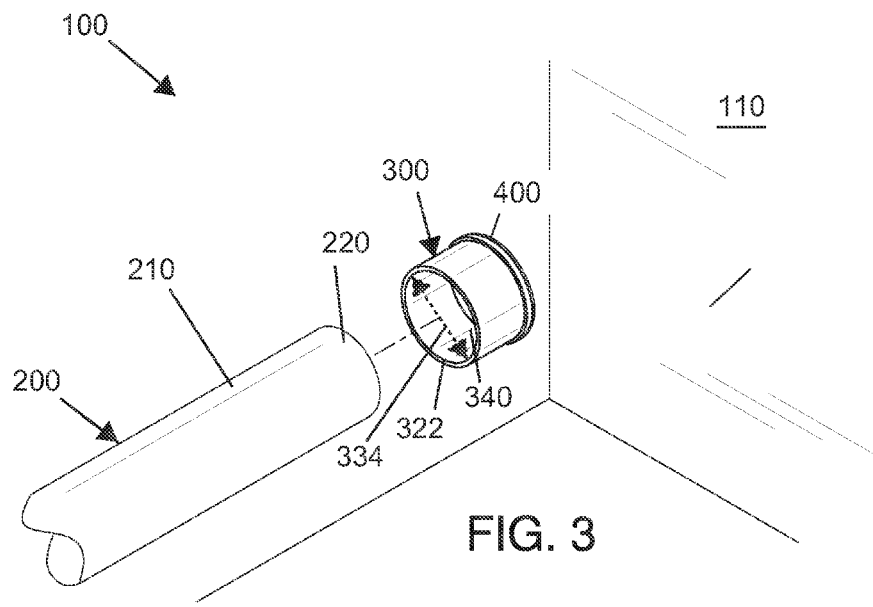
FIG. 3 is a perspective view of the system of the present invention before use.
Figure 4:
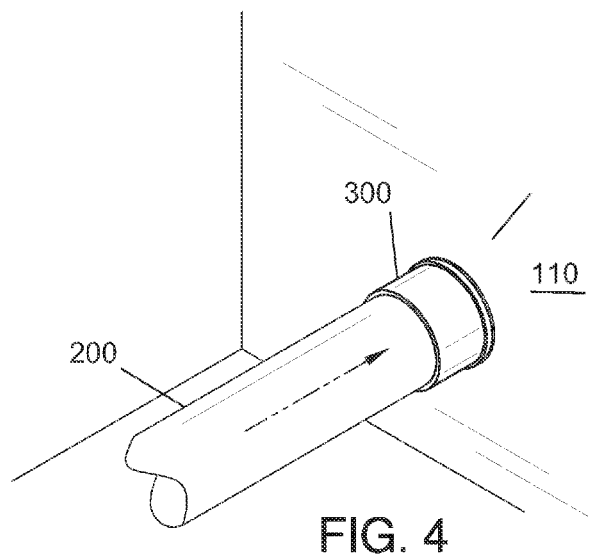
FIG. 4 is a perspective view of the system of the present invention during use.
Figure 5:
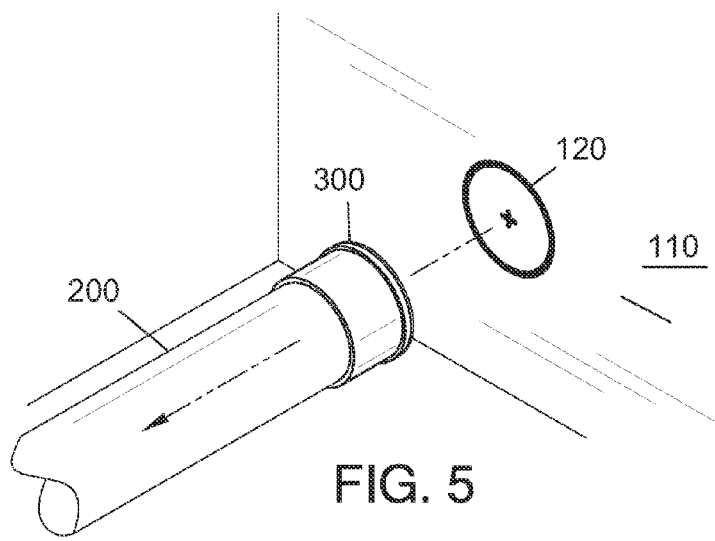
FIG. 5 is a perspective view of the system of the present invention after use.
Figure 6:
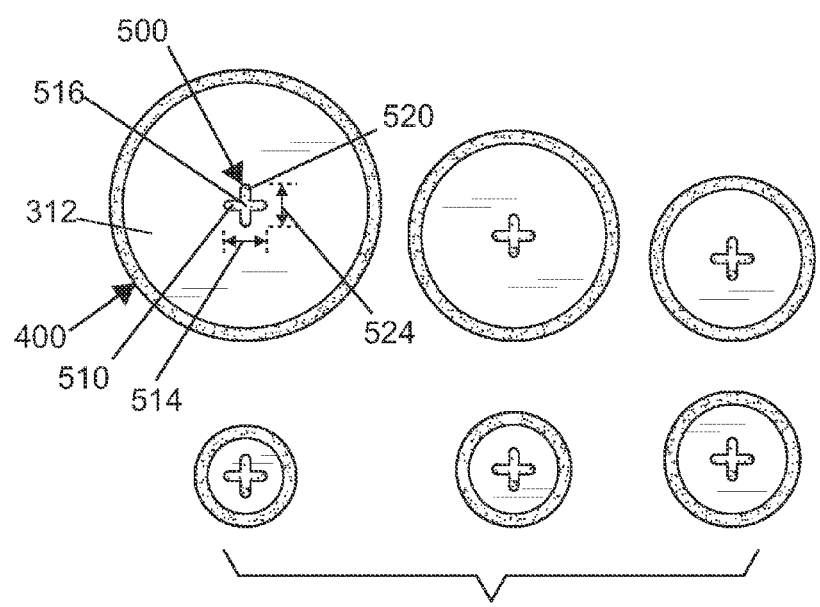
FIG. 6 is an anterior view of the first rubber stamp projection and second rubber stamp projection of the present invention.

Following is a list of elements corresponding to a particular element referred to herein:
100 Marking system
110 Marking surface
120 Mark
200 Cylindrical projection
210 Projection outer diameter
220 Projection end
300 Cylindrical stamp
310 Stamp anterior side
312 Stamp anterior surface
314 Anterior surface outer periphery
320 Stamp posterior side
322 Stamp posterior aperture
330 Stamp side wall
332 Stamp side wall outer diameter
334 Stamp side wall inner diameter
338 Stamp side wall outer periphery
340 Stamp inner cavity
350 Stamp shoulder
352 Shoulder outer diameter
400 First rubber stamp projection
402 First rubber stamp projection outer diameter
404 First rubber stamp projection inner diameter
410 Annulus
500 Second rubber stamp projection
510 First line
512 First line midline
514 First line length
520 Second line
522 Second line midline
524 Second line length Referring now to FIG. 1-6, the present invention features a marking system (100) for cutting an aperture for a cylindrical projection (200). In some embodiments, the system (100) comprises a cylindrical projection (200) having a projection outer diameter (210). In some embodiments, the cylindrical projection (200) comprises an end. In some embodiments, the end is generally planar.

In some embodiments, the system (100) comprises a generally cylindrical stamp (300) having a stamp anterior side (310), a stamp posterior side (320), and a stamp side wall (330). In some embodiments, the stamp posterior side (320) comprises a stamp posterior aperture (322) located thereon fluidly connected to a stamp inner cavity (340). In some embodiments, the stamp side wall (330) comprises a stamp side wall outer diameter (332) and a stamp side wall inner diameter (334). In some embodiments, a stamp anterior side (310) comprises a generally planar stamp anterior surface (312). In some embodiments, the stamp anterior surface (312) is located perpendicular to the stamp side wall (330).

In some embodiments, the stamp anterior side (310) comprises a stamp shoulder (350) located on a stamp side wall outer periphery (338) adjacent to an intersecting edge adjoining the anterior surface outer periphery (314). In some embodiments, the stamp shoulder (350) comprises a shoulder outer diameter (352).

In some embodiments, the stamp side wall inner diameter (334) is about equal to the projection outer diameter (210). In some embodiments, the stamp side wall inner diameter (334) is adapted to be slidably inserted over the projection outer diameter (210).

In some embodiments, the system (100) comprises a first rubber stamp projection (400) located on the stamp anterior surface (312) having an annulus (410) that perpendicularly projects out and away from the stamp anterior surface (312). In some embodiments, the first rubber stamp projection (400) comprises a first rubber stamp projection outer diameter (402) equal to the shoulder outer diameter (352).

In some embodiments, the system (100) comprises a second rubber stamp projection (500) centrally located on the stamp anterior surface (312) comprising a first line (510) having a first line midline (512) centrally located on the stamp anterior surface (312) and a second line (520) having a second line midline (522) centrally located on the stamp anterior surface (312) intersecting the first line midline (512). In some embodiments, the second line (520) is located perpendicularly to the first line (510). In some embodiments, a first line length (514) is equal to a second line length (524). In some embodiments, together the first line (510) and the second line (520) comprise a general shape of an "X". In some embodiments, the first line (510) and the second line (520) resembling the general shape of the "X" are located at the center of the first rubber stamp projection (400) at the center of the stamp anterior surface (312).

In some embodiments, the cylindrical stamp (300) is adapted to be inserted onto a projection end (220) via the stamp posterior aperture (322). In some embodiments, the first rubber stamp projection (400) and the second rubber stamp projection (500) are adapted to be placed against a marking surface (110) for applying a mark (120) for cutting an aperture for cylindrical projection (200) clearance.

In some embodiments, the first rubber stamp projection (400) is self-inking. In some embodiments, the second rubber stamp projection (500) is self-inking.

In some embodiments, a first rubber stamp projection inner diameter (404) is equal to the projection outer diameter (210).

In some embodiments, the first rubber stamp projection outer diameter (402) is equal to the projection outer diameter (210).

In some embodiments, the cylindrical projection (200) is a pipe.

In some embodiments, the cylindrical projection (200) is a tube.

In some embodiments, the cylindrical projection (200) is a hose.

In some embodiments, the cylindrical projection (200) is a wire.

In some embodiments, a method of marking a marking surface (110) for cutting an aperture for a cylindrical projection (200) comprises obtaining a marking system (100) comprising a cylindrical projection (200) having a projection outer diameter (210).

In some embodiments, the method comprises inserting the cylindrical stamp (300) onto a projection end (220) via the stamp posterior aperture (322).

In some embodiments, the method comprises inking the first rubber stamp projection (400) and the second rubber stamp projection (500).

In some embodiments, the method comprises placing the first rubber stamp projection (400) and the second rubber stamp projection (500) against a marking surface (110) for applying a mark (120) for cutting an aperture for cylindrical projection (200) clearance.

As used herein, the term "about" refers to plus or minus 10% of the referenced number. For example, an embodiment wherein the projection is about 10 inches in length includes a projection that is between 9 and 11 inches in length.

The disclosures of the following U.S. Patents are incorporated in their entirety by reference herein: U.S. Pat. No. D 319,794; U.S. Patent Publication No 2008/0092401; U.S. Patent Publication No. 2003/0126756; U.S. Pat. No. 6,470,585; U.S. Pat. No. 3,913,235; and U.S. Pat. No. 3,745,664.

Various modifications of the invention, in addition to those described herein, will be apparent to these skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A marking system (100) for cutting an aperture for a cylindrical projection (200), wherein said system (100) comprises:
   (a) a cylindrical projection (200) having a projection outer diameter (210);
   (b) a generally cylindrical stamp (300) having a stamp anterior side (310), a stamp posterior side (320), and a stamp side wall (330), wherein the stamp posterior side (320) comprises a stamp posterior aperture (322) disposed thereon fluidly connected to a stamp inner cavity (340), wherein the stamp side wall (330) comprises a stamp side wall outer diameter (332) and a stamp side wall inner diameter (334), wherein the stamp anterior side (310) comprises a generally planar stamp anterior surface (312), wherein the stamp anterior surface (312) is disposed perpendicular to the stamp side wall (330), wherein the stamp anterior side (310) comprises a stamp shoulder (350) disposed on an stamp side wall outer periphery (338) adjacent to an intersecting edge adjoining an anterior surface outer periphery (314), wherein the stamp shoulder (350) comprises a shoulder outer diameter (352), wherein the stamp side wall inner diameter (334) is about equal to the projection outer diameter (210), wherein the stamp side wall inner diameter (334) is adapted to be slidably inserted over the projection outer diameter (210);
   (c) a first rubber stamp projection (400) disposed on the stamp anterior surface (312) having an annulus (410) that perpendicularly projects out and away from the stamp anterior surface (312), wherein the first rubber stamp projection (400) comprises a first rubber stamp projection outer diameter (402) equal to the shoulder outer diameter (352);
   (d) a second rubber stamp projection (500) centrally disposed on the stamp anterior surface (312) comprising a first line (510) having a first line midline (512) centrally disposed on the stamp anterior surface (312) and a second line (520) having a second line midline (522) centrally disposed on the stamp anterior surface (312) intersecting the first line midline (512), wherein the second line (520) is disposed perpendicularly to the first line (510), wherein a first line length (514) is equal to a second line length (524), wherein together the first line (510) and the second line (520) comprise a general shape of an "X"; and
   (e) a marking surface (110);

wherein the first line midline (512) intersects the second line midline (522) at a point of intersection (516) centrally located on the stamp anterior surface (312), wherein the point of intersection (516) is central and equidistant to the first stamp projection (400), wherein the cylindrical stamp (300) is adapted to be inserted onto a projection end (220) via the stamp posterior aperture (322), wherein the first rubber stamp projection (400) and the second rubber stamp projection (500) are adapted to be placed against the marking surface (110) for applying a mark (120) for cutting an aperture for cylindrical projection (200) clearance.

2. The system (100) of claim 1, wherein the first rubber stamp projection (400) is self-inking.

3. The system (100) of claim 1, wherein the second rubber stamp projection (500) is self-inking.

4. The system (100) of claim 1, wherein a first rubber stamp projection inner diameter (404) is equal to the projection outer diameter (210).

5. The system (100) of claim 1, wherein the first rubber stamp projection outer diameter (402) is equal to the projection outer diameter (210).

6. The system (100) of claim 1, wherein the cylindrical projection (200) is a pipe.

7. The system (100) of claim 1, wherein the cylindrical projection (200) is a tube.

8. The system (100) of claim 1, wherein the cylindrical projection (200) is a hose.

9. The system (100) of claim 1, wherein the cylindrical projection (200) is a wire.

10. A method of marking a marking surface (110) for cutting an aperture for a cylindrical projection (200), wherein said method comprises:
(a) obtaining a marking system (100) comprising:
(i) a cylindrical projection (200) having a projection outer diameter (210),
(ii) a generally cylindrical stamp (300) having a stamp anterior side (310), a stamp posterior side (320), and a stamp side wall (330), wherein the stamp posterior side (320) comprises a stamp posterior aperture (322) disposed thereon fluidly connected to a stamp inner cavity (340), wherein the stamp side wall (330) comprises a stamp side wall outer diameter (332) and a stamp side wall inner diameter (334), wherein the stamp anterior side (310) comprises a generally planar stamp anterior surface (312), wherein the anterior surface (312) is disposed perpendicular to the stamp side wall (330), wherein the stamp anterior side (310) comprises a stamp shoulder (350) disposed on an stamp side wall outer periphery (338) adjacent to an intersecting edge adjoining a anterior surface outer periphery (314), wherein the stamp shoulder (350) comprises a shoulder outer diameter (352), wherein the stamp side wall inner diameter (334) is about equal to the projection outer diameter (210), wherein the stamp side wall inner diameter (334) is adapted to be slidably inserted over the projection outer diameter (210),
(iii) a first rubber stamp projection (400) disposed on the stamp anterior surface (312) having an annulus (410) that perpendicularly projects out and away from the stamp anterior surface (312), wherein the first rubber stamp projection (400) comprises a first rubber stamp projection outer diameter (402) equal to the shoulder outer diameter (352),
(iv) a second rubber stamp projection (500) centrally disposed on the stamp anterior surface (312) comprising a first line (510) having a first line midline (512) centrally disposed on the stamp anterior surface (312) and a second line (520) having a second line midline (522) centrally disposed on the stamp anterior surface (312) intersecting the first line midline (512), wherein the second line (520) is disposed perpendicularly to the first line (510), wherein a first line length (514) is equal to a second line length (524), wherein together the first line (510) and the second line (520) comprise a general shape of an "X", and
(v) a marking surface (110);
wherein the first line midline (512) intersects the second line midline (522) at a point of intersection (516) centrally located on the stamp anterior surface (312), wherein the point of intersection (516) is central and equidistant to the first stamp projection (400);
(b) inserting the cylindrical stamp (300) onto a projection end (220) via the stamp posterior aperture (322);
(c) inking the first rubber stamp projection (400) and the second rubber stamp projection (500); and
(d) placing the first rubber stamp projection (400) and the second rubber stamp projection (500) against the marking surface (110) for applying a mark (120) for cutting an aperture for cylindrical projection (200) clearance.

11. A marking system (100) for cutting an aperture for a cylindrical projection (200), wherein said system (100) consisting of:
(a) a cylindrical projection (200) having a projection outer diameter (210);
(b) a generally cylindrical stamp (300) having a stamp anterior side (310), a stamp posterior side (320), and a stamp side wall (330), wherein the stamp posterior side (320) consists of a stamp posterior aperture (322) disposed thereon fluidly connected to a stamp inner cavity (340), wherein the stamp side wall (330) consists of a stamp side wall outer diameter (332) and a stamp side wall inner diameter (334), wherein the stamp anterior side (310) consists of a generally planar stamp anterior surface (312), wherein the stamp anterior surface (312) is disposed perpendicular to the stamp side wall (330), wherein the stamp anterior side (310) consists of a stamp shoulder (350) disposed on an stamp side wall outer periphery (338) adjacent to an intersecting edge adjoining an anterior surface outer periphery (314), wherein the stamp shoulder (350) consists of a shoulder outer diameter (352), wherein the stamp side wall inner diameter (334) is about equal to the projection outer diameter (210), wherein the stamp side wall inner diameter (334) is adapted to be slidably inserted over the projection outer diameter (210);
(c) a first rubber stamp projection (400) disposed on the stamp anterior surface (312) having an annulus (410) that perpendicularly projects out and away from the stamp anterior surface (312), wherein the first rubber stamp projection (400) consists of a first rubber stamp projection outer diameter (402) equal to the shoulder outer diameter (352);
(d) a second rubber stamp projection (500) centrally disposed on the stamp anterior surface (312) consisting of a first line (510) having a first line midline (512) centrally disposed on the stamp anterior surface (312) and a second line (520) having a second line midline (522) centrally disposed on the stamp anterior surface (312) intersecting the first line midline (512), wherein the second line (520) is disposed perpendicularly to the first line (510), wherein a first line length (514) is equal to a second line length (524), wherein together the first line (510) and the second line (520) consist of a general shape of an "X"; and (e) a marking surface (110);

wherein the first line midline (512) intersects the second line midline (522) at a point of intersection (516) centrally located on the stamp anterior surface (312), wherein the point of intersection (516) is central and equidistant to the first stamp projection (400), wherein the cylindrical stamp (300) is adapted to be inserted onto a projection end (220) via the stamp posterior aperture (322), wherein the first rubber stamp projection (400) and the second rubber stamp projection (500) are adapted to be placed against the marking surface (110) for applying a mark (120) for cutting an aperture for cylindrical projection (200) clearance.

* * * * *